United States Patent
Fong et al.

(10) Patent No.: US 8,174,375 B2
(45) Date of Patent: May 8, 2012

(54) DETECTION SYSTEM FOR ASSISTING A DRIVER WHEN DRIVING A VEHICLE USING A PLURALITY OF IMAGE CAPTURING DEVICES

(75) Inventors: Bernard Cheuk Mun Fong, Kowloon (HK); Wan Chi Siu, Kowloon (HK)

(73) Assignee: The Hong Kong Polytechnic University, Hong Kong (HK)

( * ) Notice: Subject to any disclaimer, the term of this patent is extended or adjusted under 35 U.S.C. 154(b) by 458 days.

(21) Appl. No.: 12/495,508

(22) Filed: Jun. 30, 2009

(65) Prior Publication Data
US 2010/0328055 A1  Dec. 30, 2010

(51) Int. Cl.
*G08B 21/00* (2006.01)
(52) U.S. Cl. ............ 340/425.5; 340/435; 348/148; 701/301
(58) Field of Classification Search .......... 340/425.5, 340/435, 436; 348/148, 149; 701/301
See application file for complete search history.

(56) References Cited

U.S. PATENT DOCUMENTS

| | | | |
|---|---|---|---|
| 6,405,132 B1 | 6/2002 | Breed et al. |
| 6,690,268 B2 | 2/2004 | Schofield et al. |
| 6,727,807 B2 | 4/2004 | Trajkovic et al. |
| 7,049,945 B2 | 5/2006 | Breed et al. |
| 7,205,904 B2 | 4/2007 | Schofield |
| 7,209,221 B2 | 4/2007 | Breed et al. |
| 7,277,123 B1 | 10/2007 | Okamoto et al. |
| 7,293,888 B2 | 11/2007 | Hutzel et al. |
| 7,295,925 B2 | 11/2007 | Breed et al. |
| 7,313,467 B2 | 12/2007 | Breed et al. |

*Primary Examiner* — Jeffery Hofsass
(74) *Attorney, Agent, or Firm* — Kilpatrick Townsend & Stockton LLP (57) ABSTRACT

A detection system (5) for assisting a driver when driving a vehicle, the system (5) comprising: a plurality of image capturing devices (98) mounted to the vehicle to capture images of the external environment of the vehicle; an image processing module (95) to identify potential hazards in real-time from the captured images and to superimpose information of the external environment relating to the identified potential hazards; and at least one display device (92) to display images processed by the image processing module in real-time; wherein the superimposed information is provided in an area of the display device (92) to ensure visual clarity of the images of the external environment.

5 Claims, 6 Drawing Sheets

DETECTION SYSTEM FOR ASSISTING A DRIVER WHEN DRIVING A VEHICLE USING A PLURALITY OF IMAGE CAPTURING DEVICES

TECHNICAL FIELD

The invention concerns a detection system for assisting a driver when driving a vehicle.

BACKGROUND OF THE INVENTION

Side view mirrors increase the drag coefficient of a vehicle. Consequently, fuel consumption is increased.

Many factors may improve driving safety including an increased Sever of awareness of potential hazards while driving, in certain environmental conditions, it is desirable to enhance or augment visual information provided to the driver to highlight the existence of potential hazards and direct the focus of the driver in order to maintain safe driving.

SUMMARY OF THE INVENTION

In a first preferred aspect, there is provided a detection system for assisting a driver when driving a vehicle. The system includes a plurality of image capturing devices mounted to the vehicle to capture images of the external environment of the vehicle. The system also includes an image processing module to identify potential hazards in real-time from the captured images and to superimpose information of the external environment relating to the identified potential hazards. The system also includes, at least one display device to display images processed by the image processing module in real-time. The superimposed information is provided in an area of the display device to ensure visual clarity of the images of the external environment.

The image processing module may include video extraction logics to extract and identify potential hazards, the video extraction logics detecting the variations between successive frames captured by the plurality of image capturing devices.

The system may further include a camera for tracking eye movement and head movement in order to detect the behaviour of the driver in anticipation of intention, and the detected behaviour is used by the image processing module to determine objects of concern that are highlighted to the driver on the at least one display device.

The system may further include a switch operatively connected to a steering wheel of the vehicle to detect the abnormal drift of the vehicle, and the detected abnormal drift is used by the image processing module to determine objects of concern that are highlighted to the driver on the at least one display device.

The displayed images may be augmented by adjusting contrast levels of the captured images in response to a background color from the external environment.

The system may further include an alert module to generate a speed dependent audible alert when immediate danger is detected to warn the driver not to change lane when there is a risk of colliding with an object.

If the video extraction logics detects variations between the frames, a tracking sequence of an identified potential hazard may be activated in subsequent frames as a precautionary measure without issuing an indication to the driver while the vehicle is continuously driven in the same lane.

The system may further include a spatial segmentation module and a temporal segmentation module to estimate spatial and temporal separation based on relative traveling speed detected between two sequential frames.

Spatial segmentation may be performed in each frame to improve accuracy of the video extraction logics or when large variations in the background between successive frames are detected.

Spatial and temporal segmentation and fusion may be adaptively performed by detecting the variation between successive frames to reduce computational complexity and improve data processing speed.

The system may further include a variation computation module to execute an adaptive frame skipping algorithm to decompose the successive frames to preclude error augmentation and propagating during the tracking sequence.

The video extraction logics may generate a hierarchy of temporal variation representations with luminance consistency that describes the illumination variations in order to estimate and compensate for global motion.

If user interaction is imposed, spatial segmentation may be fused with a mask before fusing with temporal segmentation.

BRIEF DESCRIPTION OF THE DRAWINGS

An example of the invention will now be described with reference to the accompanying drawings, in which.

DETAILED DESCRIPTION OF THE DRAWINGS

Figure 9:
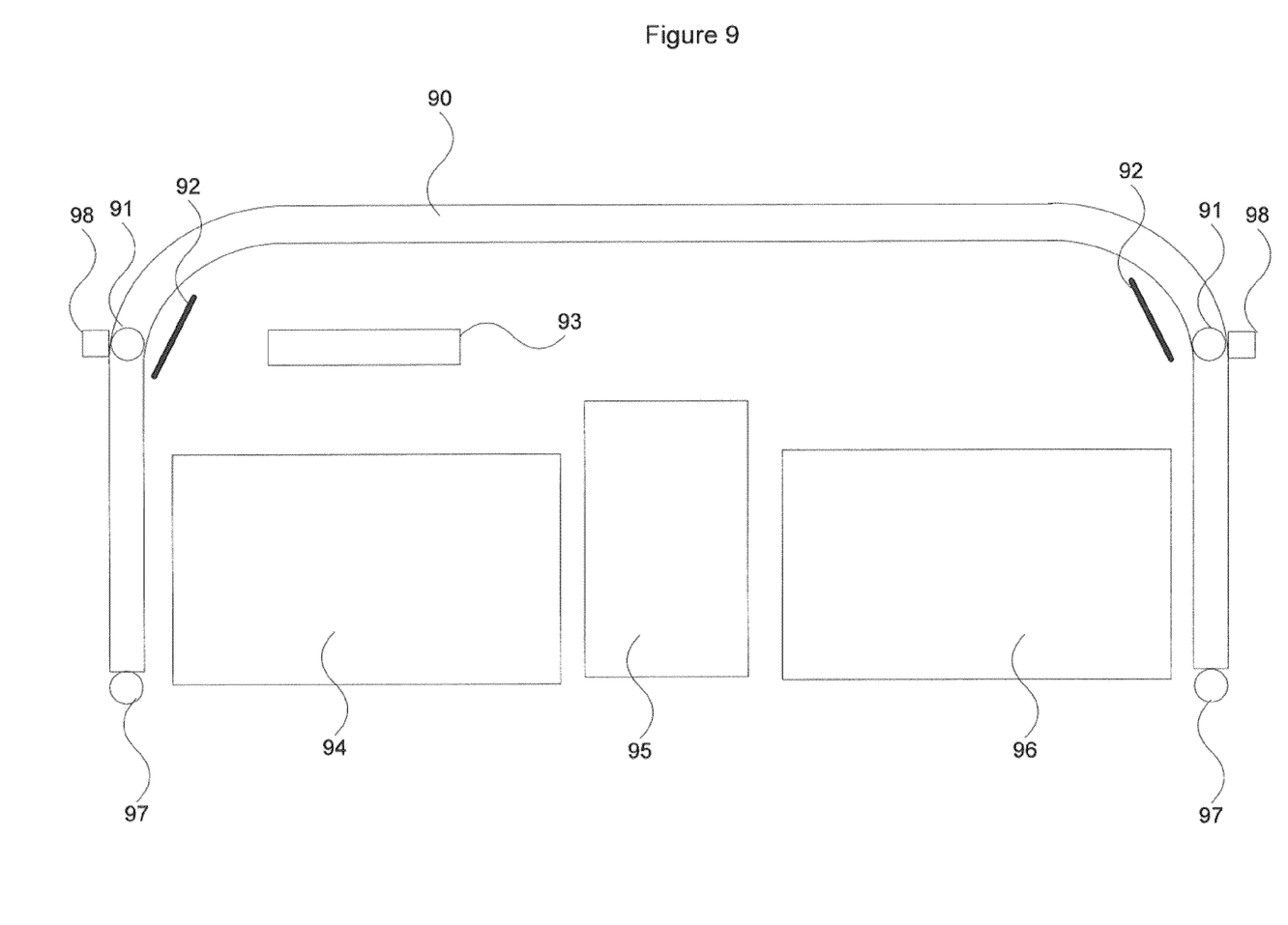
FIG. 9 is a block diagram of a detection system for a vehicle in accordance with an embodiment of the present invention.

Referring to the drawings, a detection system 5 for assisting a driver when driving a vehicle is provided. The system 5 generally comprises: a plurality of image capturing devices 98, an image processing module 95 and multiple display devices 92. The plurality of image capturing devices is mounted to the vehicle to capture images of the external environment of the vehicle. The image processing module identifies potential hazards in real-time from the captured images and superimposes information of the external environment relating to the identified potential hazards. The image processing module 95 may be provided in a center console 95 located between the seat 94 of the driver and seat 98 of the front passenger. The multiple display devices are LCD panels 92 which display images processed by the image processing module 95 in real-time. The superimposed information is provided in an area of the LCD panels 92 to ensure visual clarity of the images of the external environment.

The original exterior side mirrors on the vehicle are replaced by the small video cameras 98. By removing the original side mirrors, a reduction in the drag coefficient of the vehicle is achieved which improves fuel efficiency There may be four to six video cameras 98 mounted on a vehicle, for example, at the location of the B pillar 97 also. The image from each camera 98 is captured at 25 frames per second (fps). Each image is therefore updated once every 40 ms. The visual information from the cameras 98 is input to a processor. The system 5 extracts and identifies any potential hazards using video extraction logics. Appropriate signs and signals are displayed to alert the driver. Various methods may be used to automatically defect the behavior of driver/Vehicle in anticipation of its intention thereby correctly pinpoint relevant objects of concern. This includes situations such as changing lanes in different conditions and reverse parking. The video extraction logics enable identification of nearby vehicles that may cause potential hazards. Visual and audible alerts are generated. Also, information: about approaching vehicle including traveling speed, relative speed to the driven vehicle, and estimated clearance time for a safe lane change are displayed to assist a safe lane change.

The LCD panels 92 are mounted on both sides inside the A-pillar 91 so that the windscreen 90 is unobstructed. When the system 5 is operating, a first frame is captured and displayed on the LCD screen 92. The LCD screen 92 is continuously updated until the ignition is switched off. The LCD panels 82 are adjustable with a little joystick for optimal viewing. There is also a memory setting which remembers the position of the driver's seat 94 and height of the steering wheel 43 if it is fitted with electronic adjustment. The optimal LCD screen size, when viewed from the driving position, is about 6". This is perceived by the driver to be slightly larger than the normal side view mirror.

Figure 1:
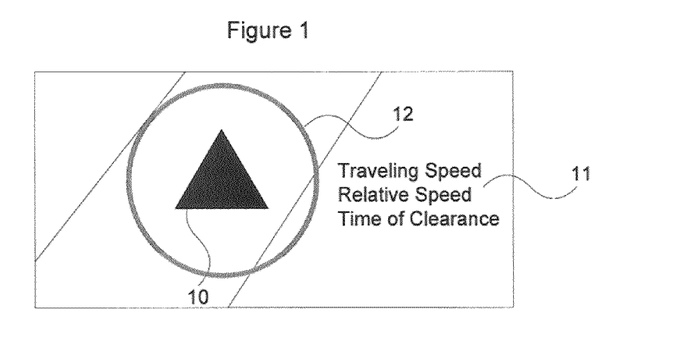
FIG. 1 is a screen representation of the display when a driver wishes to make a right lane change.
Figure 2:
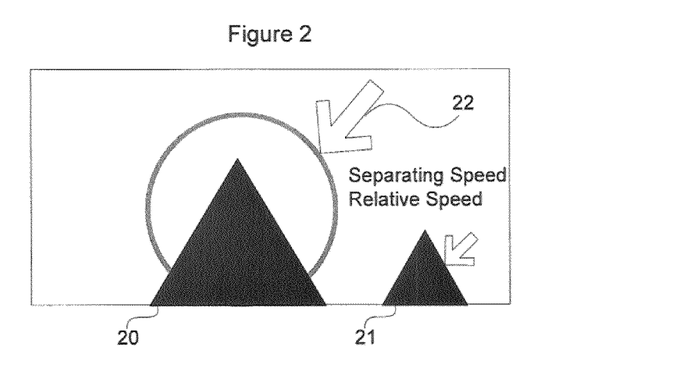
FIG. 2 is a screen representation of the display when a driver wishes reverse park.

Turning to FIG. 1, at cruising speed, the driver signals right and slight movement of the vehicle indicates to the system 5 that the driver intends to make a right lane change. Approaching vehicles 10 are extracted from the background using video processing technology and related information 11 is calculated, to alert the driver. A flashing red circle 12 highlights any incoming vehicle 10 to alert the driver. Information 11 about the vehicle 10 is displayed including: current speed is 64 km/h, relative speed is +4.7 km/h (the vehicle the driver is driving is currently traveling at around 59 km/h) and based on current speed of each vehicle, the system 5 calculates a 1.6 second clearance for a safe lane change FIG. 2 depicts a reverse parking example. As the driver reverses to park, two potential hazards 20, 21 are defected by the system 5. A post 20 is detected 0.3 m away from the rear end of the vehicle and a wall 21 is detected 0.7 m away from the rear end of the vehicle. The closer object is the post 20 which is highlighted by a larger arrow 22. The size of the arrow corresponds to the distance from the vehicle. Both objects 20, 21 detected in this example are stationary therefore no information about their relative movements is displayed. The information which is displayed includes minimal distance (at the point closest to the car). This information is in the form of both text and an indicating arrow which changes size based on distance away from the vehicle. A red dash indicates that the vehicle has stopped hence no remaining time to physically contact the objects is available for display. Otherwise, when the vehicle is moving, the time to reach each object is displayed.

To avoid causing unnecessary confusion to the driver, a maximum of two objects (of shortest distance) are visually identified at any given time. This prevents the display from being overwhelmed with too much information. The driver may set a predetermined distance to trigger an audible alarm, for example, when the distance is less than thirty centimeters.

The system 5 modifies the displayed image to the driver in several ways. These include: changing the colour of the displayed items (text, circles, etc) based on the background of the external environment, highlighting changes based on urgency and adaptive contrast adjustment and glare reduction.

Figure 3:
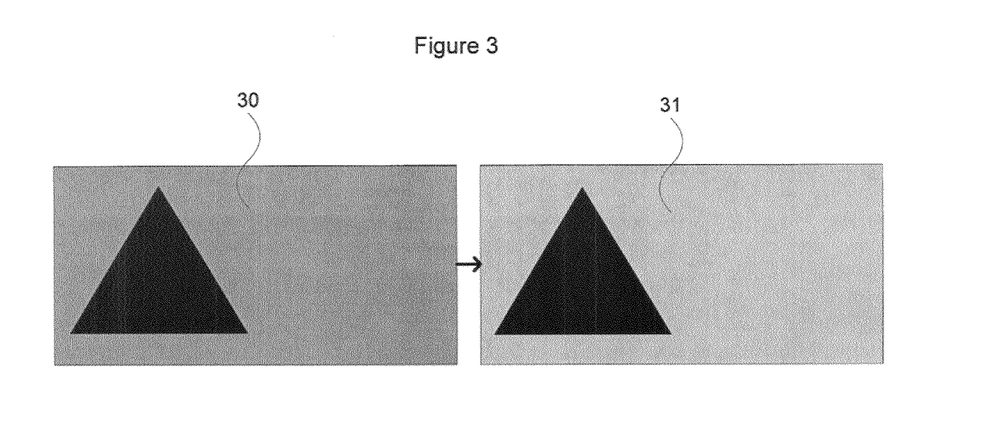
FIG. 3 is a screen representation of the display when adaptive contrast adjustments are applied comparing before the adjustment (left image) and after the adjustment (right image)

Turning to FIG. 3, under situations such as heavy fog, the contrast level of the display is automatically adjusted to improve viewing quality. For comparative purposes only, the let image 30 is an unaltered image and the right image 31 has adjusted the contrast level of the left image to improve viewing quality. Also, glare from the headlamps of vehicles behind the vehicle are reduced by selectively reducing the light intensity on the display. Pixels detecting bright lights are momentarily made less sensitive. In addition, the system 5 assists in night driving by optimally adjusting the display based on ambient lighting conditions.

Figure 4:
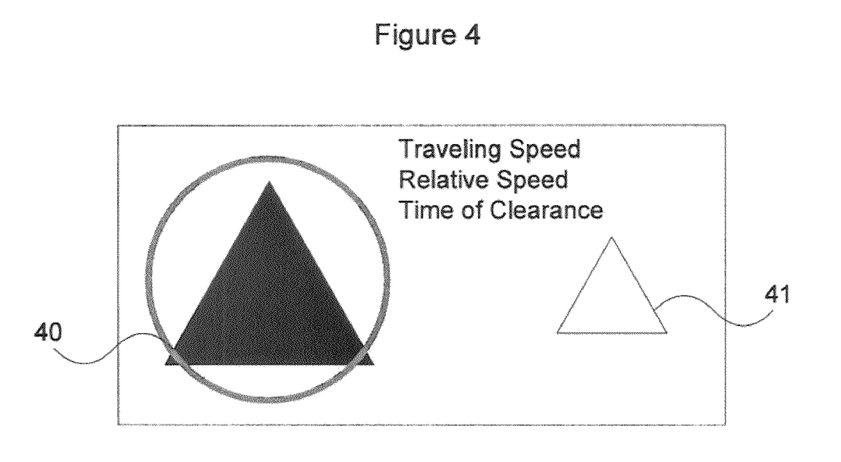
FIG. 4 is a screen representation of the display that is adjusted optimally based on ambient lighting conditions where, an approaching vehicle is highlighted while other vehicles in the background are subdued.
Figure 5:
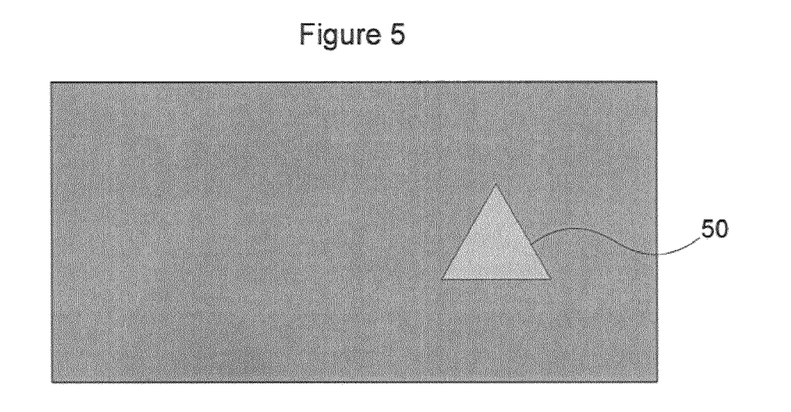
FIG. 5 is a screen representation of the display illustrating that vehicles too far away to cause concern are not highlighted

Turning to FIG. 4, the vehicle 41 represented by the white triangle is further back than the vehicle 40 represented by the black triangle. The vehicle 41 represented by the white triangle is subdued in the background so that the driver pays less attention to it while concentrating on the much nearer one (the vehicle 40 represented by the black triangle). Referring to FIG. 5, other vehicles 50 which are too far away from the vehicle to cause concern are not highlighted.

Typically, a driver would take a number of subtle actions prior to signaling three seconds before making an anticipated lane change. The system 5 senses the behavior of the driver in real-time in the following ways:

(1) yore frequent starring at the respective side mirror. For example, when the driver intends to make a right lane change, they would naturally check the right mirror more often. This is detected by eye movement sensing using sensor selection of an auto-focus camera.

(2) The system 5 defects more frequent minor movement of head to a certain side, for example, a slight turn towards the right before signaling to indicate the intention of the driver.

(3) Inexperienced drivers may have the tendency to steer the vehicle slightly when a change lane is desired. A comparison is made relative to the contour of the driving lane. When an abnormal drift of the steering wheel 93 is detected, this may also indicate the intention of the driver of to make a lane change.

(4) When the driver signals the let or right indicator, the system 5 considers this to be a confirmation of the anticipated lane change intention. Audible warnings can also be activated if danger from the adjacent lane is detected at the time.

There are several practical ways of sensing the driver behavior described earlier. These Include facial detection by tracking eye movement and head movement by a small low resolution camera fitted near the central rear vision mirror. This is an economical solution. The steering wheel may also be connected to a switch that closes when an abnormal drift is detected. This activates the warning unit that begins to identify any potentially hazardous moving objects that are displayed by the side view mirror.

The system 5 is designed to proactively identify potential hazards while causing minimal distraction to the driver. Therefore, alerts are only displayed when the driver intends to change lane. Any of the following conditions trigger an alert by highlighting the object:

1) drift in steering causing the gap between the vehicle and the object to decrease;

2) driver signals to indicate intention to turn towards the direction of the object;

3) motion detection showing more regular gazing at the mirror.

A speed dependent audible alert is generated when immediate danger is detected so that the driver is warned not to change lane when there is a risk of colliding with another object. The traveling speed of the identified object, along with its relative speed to the vehicle, is calculated to give the driver adequate information to determine whether a lane change is safe. The actual spatial separation from the vehicle is only used for calculation purposes but not displayed as the actual distance is not of any practical use to the driver. From the relative speed and spatial separation, an estimation on the time that takes for the object to catch up with the vehicle can be calculated so that the driver can be informed of how much time there is to cut in front of the object. In this particular illustration, the object is assumed to travel at a variable speed and the information is constantly updated. Tracking of any identified object ceases once it disappears from three consecutive frames under the assumption that the object no longer poses any risk.

Figure 6:
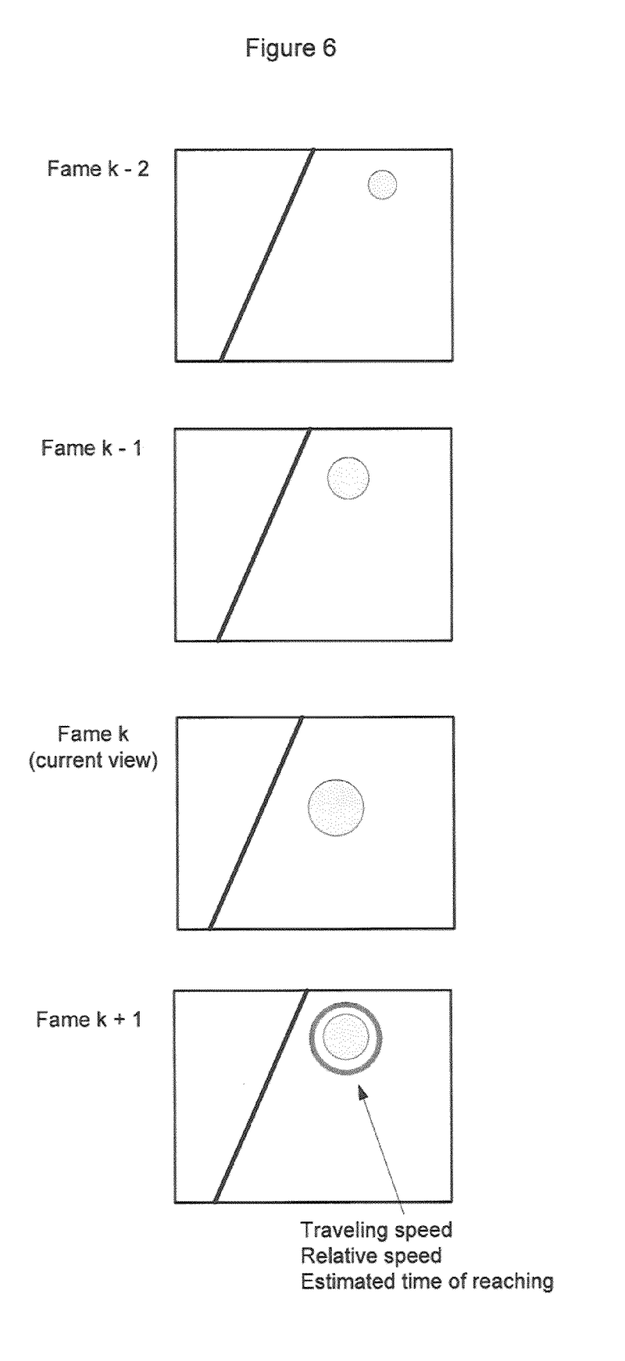
FIG. 6 is a Object tracking principle
Figure 7:
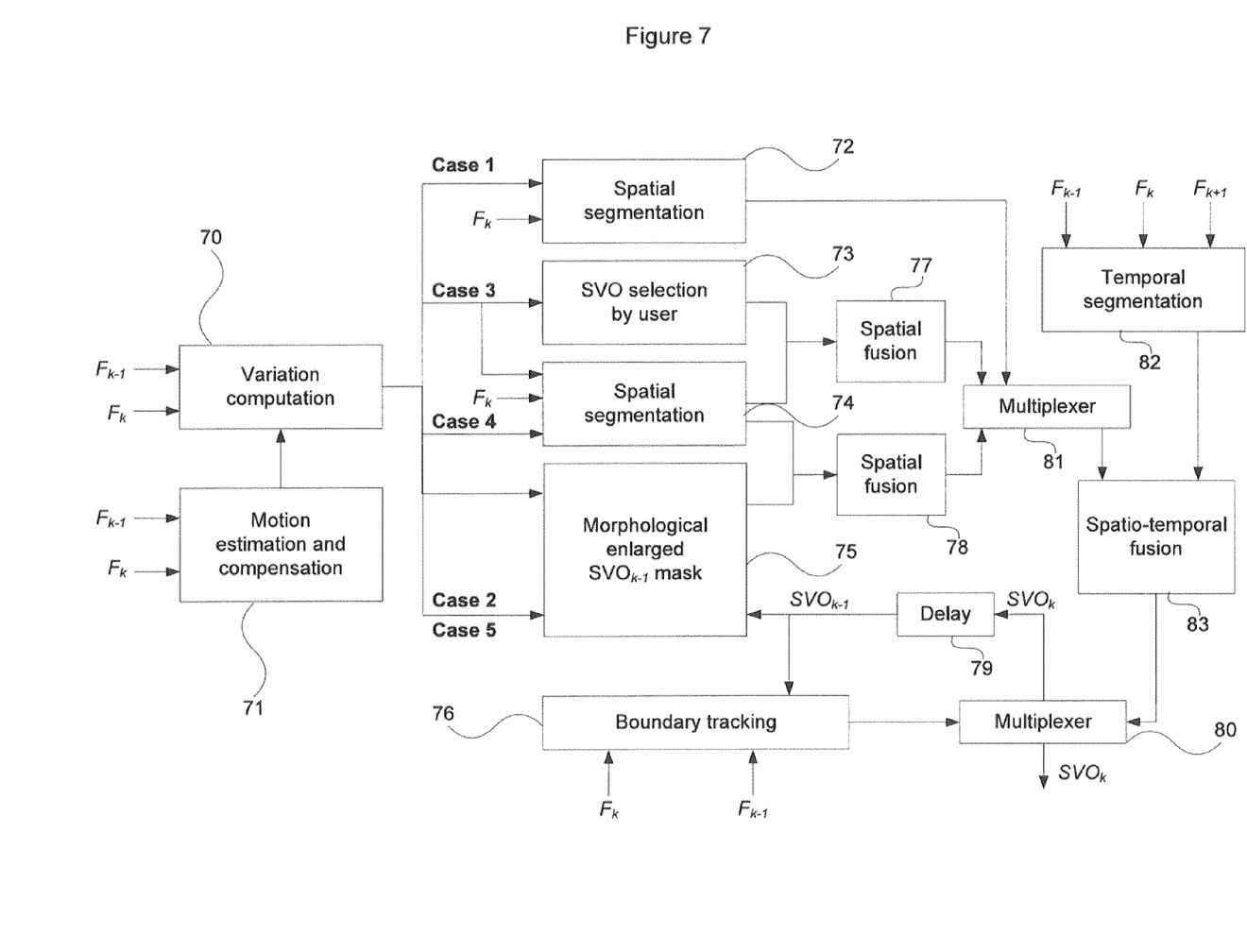
FIG. 7 is a block diagram of video object extraction.
Figure 8:
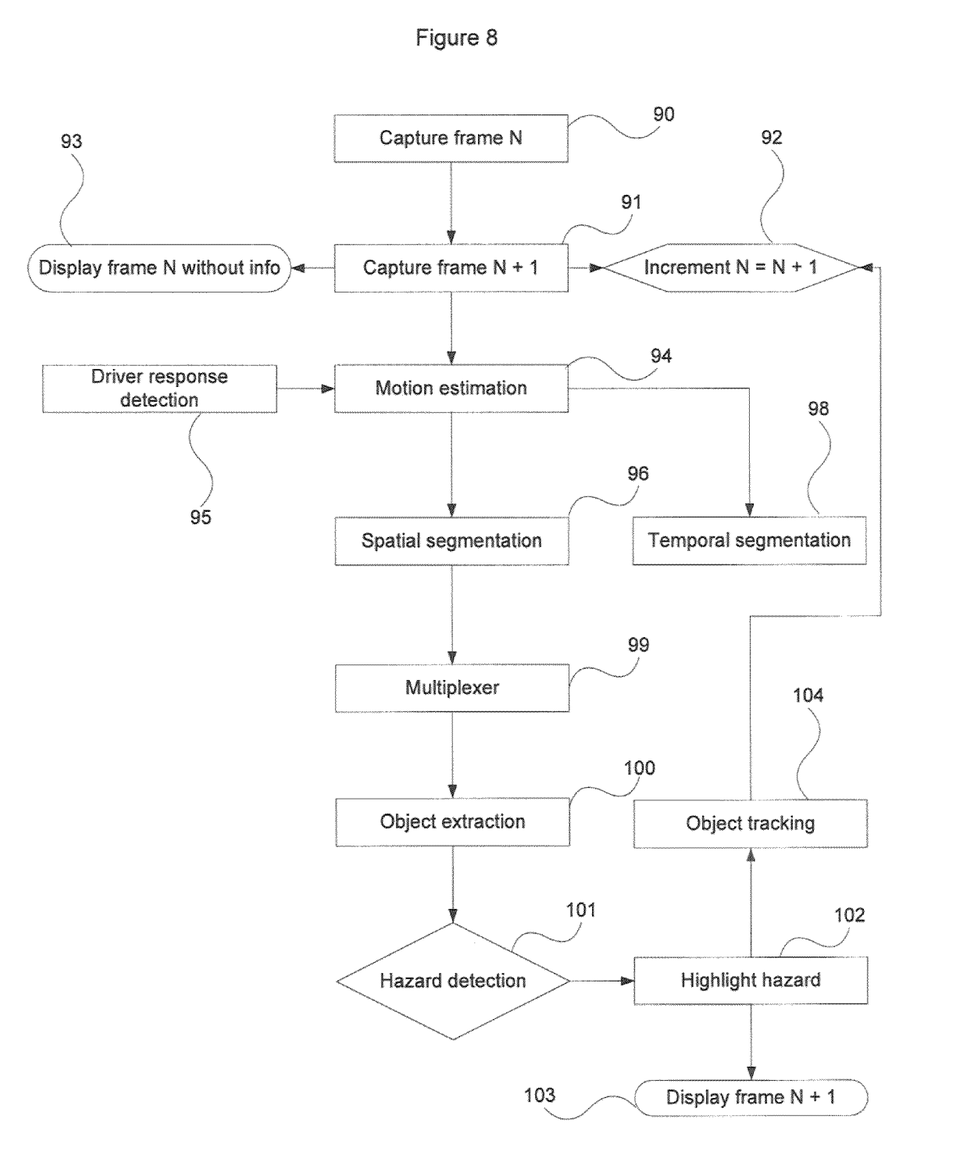
FIG. 8 is a process flow diagram of the semantic video object (SVO) algorithm.

Referring to FIG. 8, each frame is compared with previous frames to detect relative movement of vehicles within range. Starting from the $k^{th}$ frame, the system 5 evaluates k−1 and k−2 to extract vehicles that have moved closer to the vehicle during the previous two frames. Four successive frames are illustrated in FIG. 6. k−1 observes an object (a nearby moving vehicle) which becomes closer than in frame k−2. When the same object appears in frame k its position is compared to that of k−1. The reduction in separation from the vehicle in the frame activates a tracking sequence of the object in subsequent frames as a precautionary measure and no indication to the driver is issued while the vehicle is continuously driven along the same lane. Based on relative traveling speed detected between two sequential frames, an estimation of spatial and temporal separation can be calculated and displayed on the display. Spatial segmentation means partitioning the image to a number of arbitrarily shaped regions, each of them typically being assumed to constitute a meaningful part of the image, i.e. to correspond to one of the objects depicted in if or to a part of one such object, Referring to FIGS. 7 and 8, a semantic video object (SVO) algorithm is depicted. Accuracy in correctly identifying potentially hazardous objects is vital since an inaccurate SVO containing any part of the background merged to the object or losing parts of the object can severely affect the calculation of its relative position from the vehicle. Maintaining accuracy is a challenging issue for video sequences containing complex backgrounds in inner city or fast moving vehicles on a motorway. Accuracy can be improved by performing spatial segmentation in each frame. However, to reduce computational complexity and improve data processing speed, the system 5 adaptively performs spatial 77, 78 and temporal segmentation 82 and fusion 83 when necessary by defecting the variations between successive frames. Spatial and temporal segmentation is only performed when large variations in background between successive frames are detected. Otherwise, the system 5 tracks the previous boundary of the SVO.

The motion estimation and compensation module 71 of the system 5 constantly searches for other potential hazards that may soon come within range. The spatial segmentation modules 72, 74 of the system 5 also track the movement of all identified objects. For example, the identified vehicle 10 may accelerate or decelerate and its movement is tracked to determine its position in real-time relative to the vehicle. In such situations, the information is updated in real-time and an audible sound alerts the driver when this vehicle is closing in at a faster rate.

The temporal segmentation module 82 is used to detect and track moving objects such that any object moving towards the vehicle at a speed higher than that of the vehicle's current speed can be identified with its movement tracked and compared with the previous frame; object boundaries with pixel accuracy can be estimated in the process. At the same time, unrelated foreground and background areas can be extracted and eliminated while tracking relevant moving objects. Next, object detection with spatio-temporal fusion motion trajectories 83 from the moving object currently being tracked will generate a hierarchical description of the object's movement from trajectory data for the SVO.

The SVO identifies the initial object contour of any object that appears in the frame, any moving object is extracted from the (stationary) background and tracked on a frame-by-frame basis. An adaptive frame skipping algorithm is executed in the variation computation module 70 to decompose video sequence/successive frames to preclude error augmentation and propagating during the object tracking process.

Turning to FIG. 7, Case 1 shows the normal cruising condition when nearby moving objects are tracked by the spatial segmentation module 72.

If the vehicle is pulled over, Case 2 indicates the situation where the vehicle remains stationary and the vehicle is expected to be driven away at any time so that the system continues monitoring the surrounding in case the vehicle is driven back onto the road. In this case, only one side of the system is activated.

Case 3 allows manual intervention by the driver, particularly useful in situations such as overtaking when the vehicle suddenly accelerates. Depending on the vehicle driven, it may already have a user interface that enables swift manual intervention of the system, such as by suspending all audible warning signals through touching a large area of a touch screen that corresponds to temporary suspension which requires SVO selection by the user 73. The main purpose of this feature is to allow the driver quick access to manually disabling warnings that are unnecessary and may cause unnecessary attention during certain driving conditions. In this case, the automatic hazard detection system can either be temporarily disabled or any nearby vehicle such as the one to be overtaken can be selected to be tracked so that information on relative speed and distance can be calculated in real-time.

Case 4 shows any immediate dangers detected and highlighted, information from the previous frame is used for continued tracking of nearby vehicle causing elevated hazard. At the same time, all other vehicles within the frame are still tracked in case they too cause danger at a later time.

Case 5 is activated during parking. Boundary tracking 78 is used for monitoring slow-moving objects or when the vehicle is reversing at low speed. Morphological differences are examined by compared with the previous frame for tracking of slow movement with high precision. This is accomplished by multiplexing the outputs from spatial-temporal and boundary tracking to generate the SVO parameter for the current frame as seen on the display using the multiplexers 80, 81.

The delay 79 tracks the frame sequence in such a way that the current frame becomes one previous in the context of a continuously updating video sequence.

The system 5 first estimates and compensates for global motion based on a simplified linear model. The simplified linear model is a model for video segmentation. To estimate the parameters for the simplified linear model, a hierarchical block matching and least square approximation are used. The SVO algorithm generates a hierarchy of temporal variation representations with luminance consistency that describes the illumination variations. The variation between successive frames N and N+1 is derived using the sum of the second derivative of the frame luminance of each pixel. The SVO algorithm extracts information between these successive images of any given sequence on temporal variations using motion and variations of illumination parameters.

The system 5 performs SVO extraction according to two criteria. Firstly, if the variation between successive frames k−1 and k is larger than a predefined threshold Tv, spatial and temporal segmentation is performed and fused. This obtains an accurate SVO. Otherwise, the system 5 tracks the boundary of the extracted SVO in frame M to produce an SVO for frame N−1. This reduces the computational complexity and amount of processing time.

Secondly, if user interaction is imposed, spatial segmentation must be fused with the is mask 75 of the SVO that the driver provides or the system 5 obtains from frame k−1 before fusing with temporal segmentation. Temporal segmentation defects moving regions from the background of each frame. The system 5 then removes the connected components with an area less than a predefined threshold (a constant percentage of the frame size) by using a morphological opening operation. The predefined threshold is not fixed for classifying the detected motion change as a moving vehicle. Generally, the purpose of identifying the foreground from the background is to only track objects of potential concern. For example, a nearby vehicle that approaches from the adjacent lane should take up at least one block within a given frame. The representation of such a vehicle should be different from that of the next frame. Such difference is identified and used to track the movement of the object. Holes inside the moving objects areas are then removed by sequentially performing opening and closing operations. Finally, boundary tracking is performed when the variation between successive frames is below the predefined threshold.

In FIG. 8, frame N is captured during any given time while driving under normal conditions. It updates to the next frame N+1, which may or may not contain any useful information compared to frame N. When no hazard is detected, as expected for the majority of time when the vehicle is cruising, the process continually repeats itself 92, 93. Motion estimation continues to defect any change in environment. The detection of the driver's response 95, for example, a lane change indicated, will search and detect any object of potential hazardous nature 100.

An image encoder (for example, an encoder that performs DOT or Karhunen-Loeve transform) divides each frame into blocks. Each block contains vectors portraying the manifestation spaces of the tracked objects. As the vehicle moves, the background changes while the key features should not differ significantly between any two successive frames. The sequence of frames therefore have a high temporal redundancy. Consequently, a continuously strong inter-frame reference exists in the sequence. The correlation of inter-frame reference in each frame and its temporal changes are used to compute the probability of a sudden and significant change within a block of several consecutive frames, i.e. in a fraction of a second's time where a substantial change is anticipated such as when a fast moving vehicle is closing in. Temporal segmentation relies on motion information acquired from consecutive frames that does not have any information about the spatial domain. When the background changes rapidly, such as negotiating a sharp bend, the background does not appear to be static when compared to the previous frame, with almost identical color patterns but very different shapes, are updated from frame to frame by embedding the residual difference between the background in the previous and current frames. Temporal segmentation splits the captured video info scenes (the background) and shots (successive frames with variation of objects' relative positions to the vehicle). Spatial segmentation splits each frame into blocks. Spatial segmentation is performed according to information of the frame such as motion features, color and texture. The purpose of performing spatial-temporal segmentation is to separate the foreground and background from each other. Therefore spatial-temporal segmentation enables extraction of any relevant objects from the ambient background in the external environment of the vehicle.

If will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

The video image processing system with a SoC (System-on-Chip) implementation, when used in conjunction with CCD cameras and LCD panels, is expected to operate very reliably over long periods of time with virtually no servicing required since it does not have any moving mechanical parts. However, in the unlikely event that the system may fail, the system can be designed to automatically activate a pair of mechanical side mirrors that are normally concealed as an integral part of the A-pillar. As these side mirrors are only deployed in the event of an emergency, similar to the case of temporarily replacing a flat tyre with a spare stored in the trunk (which is not intended for normal driving). The backup mirrors can be made small enough to be fitted into the A-pillars without impairing their physical strength or visual appearance of the A-pillars.

We claim:

1. A detection system for assisting a driver when driving a vehicle, the system comprising:

a plurality of image capturing devices mounted to the vehicle to capture images of the external environment of the vehicle;

an image processing module to identify potential hazards in real-time from the captured images and to superimpose information of the external environment relating to the identified potential hazards; and at least one display device to display images processed by the image processing module in real-time;

wherein the superimposed information is provided in an area of the display device to ensure visual clarity of the images of the external environment;

wherein the image processing module comprises video extraction logics to extract and identify potential hazards, the video extraction logics detecting the variations between successive frames captured by the plurality of image capturing device; and wherein if the video extraction logics detects variations between the frames, a tracking sequence of an identified potential hazard is activated in subsequent frames as a precautionary measure without issuing an indication to the driver while the vehicle is continuously driven in the same lane.

2. The system according to claim 1, further comprising a spatial segmentation module and a temporal segmentation module to estimate spatial and temporal separation based on relative traveling speed detected between two sequential frames.

3. The system according to claim 2, wherein spatial segmentation is performed in each frame to improve accuracy of the video extraction logics or when large variations in the background between successive frames are detected.

4. The system according to claim 2, wherein spatial and temporal segmentation and fusion are adaptively performed by detecting the variation between successive frames to reduce computational complexity and improve data processing speed.

5. The system according to claim 1, further comprising a variation computation module to execute an adaptive frame skipping algorithm to decompose the successive frames to preclude error augmentation and propagating during the tracking sequence.

* * * * *